(12) United States Patent
Contarini et al.

(10) Patent No.: US 9,435,069 B2
(45) Date of Patent: Sep. 6, 2016

(54) APPLIANCE FOR DRYING LAUNDRY

(71) Applicant: Electrolux Home Products Corporation N.V., Brussels (BE)

(72) Inventors: Andrea Contarini, Sacile (IT); Massimo Viero, Pianezze (IT)

(73) Assignee: Electrolux Home Products Corporation N.V., Brussels (BE)

( * ) Notice: Subject to any disclaimer, the term of this patent is extended or adjusted under 35 U.S.C. 154(b) by 136 days.

(21) Appl. No.: 14/370,532

(22) PCT Filed: Jan. 3, 2013

(86) PCT No.: PCT/EP2013/050042
§ 371 (c)(1),
(2) Date: Jul. 3, 2014

(87) PCT Pub. No.: WO2013/102638
PCT Pub. Date: Jul. 11, 2013

(65) Prior Publication Data
US 2015/0082658 A1    Mar. 26, 2015

(30) Foreign Application Priority Data

Jan. 5, 2012 (EP) .................................. 12150292

(51) Int. Cl.
*D06F 58/26* (2006.01)
*D06F 58/28* (2006.01)
*D06F 58/20* (2006.01)

(52) U.S. Cl.
CPC ............. *D06F 58/28* (2013.01); *D06F 58/206* (2013.01); *D06F 2058/287* (2013.01); *D06F 2058/2877* (2013.01); *Y02B 40/72* (2013.01)

(58) Field of Classification Search
CPC ........ D06F 58/00; D06F 58/23; D06F 58/26; F26B 21/00; F26B 21/06
USPC ........ 34/595, 601, 610; 68/5 C, 5 R, 19, 20; 8/139, 149, 159; 62/79, 238.7
See application file for complete search history.

(56) References Cited

U.S. PATENT DOCUMENTS 4,327,502 A * 5/1982 Matsuo ................... D06F 58/28
34/524
7,571,553 B2 * 8/2009 Joerger ................. D06F 39/005
34/378

(Continued)

FOREIGN PATENT DOCUMENTS

BE      EP 2284310 A1 *  2/2011  .......... D06F 58/206
BE      EP 2612965 A1 *  7/2013  .......... D06F 58/206

(Continued)

OTHER PUBLICATIONS

International Search Report mailed Jun. 18, 2013 in related International Application No. PCT/EP2012/077001.

(Continued)

*Primary Examiner* — Stephen M Gravini
(74) *Attorney, Agent, or Firm* — Banner & Witcoff, Ltd.

(57) ABSTRACT

An appliance for drying laundry (100) includes a drying-air moisture-condensing system comprising a heat pump system (215,220,225) with a variable-output compressor (210) having a compression mechanism and an electric motor for driving the compression mechanism. A controller (265) is provided to vary the rotational speed of the electric motor so as to adjust the rotational speed of the compression mechanism in order to maintain constant a power absorbed by the compressor during at least a portion of a drying cycle.

15 Claims, 12 Drawing Sheets

(56) References Cited

U.S. PATENT DOCUMENTS

| | | | | |
|---|---|---|---|---|
| 8,387,273 | B2* | 3/2013 | Driussi | D06F 58/206 165/11.1 |
| 8,393,172 | B2* | 3/2013 | Sato | D06F 58/206 34/201 |
| 8,601,717 | B2* | 12/2013 | Beers | D06F 58/206 137/597 |
| 8,695,230 | B2* | 4/2014 | Noh | D06F 58/206 34/402 |
| 9,146,056 | B2* | 9/2015 | Lee | F26B 21/086 |
| 2010/0077787 | A1 | 4/2010 | Masuda et al. | |
| 2010/0107703 | A1 | 5/2010 | Hisano et al. | |
| 2010/0187219 | A1* | 7/2010 | Besore | G06Q 50/06 219/494 |
| 2010/0192397 | A1 | 8/2010 | Kim et al. | |
| 2011/0277334 | A1 | 11/2011 | Lee et al. | |
| 2011/0280736 | A1 | 11/2011 | Lee et al. | |
| 2011/0296879 | A1 | 12/2011 | Seo et al. | |
| 2012/0017615 | A1* | 1/2012 | Beers | D06F 58/206 62/115 |

FOREIGN PATENT DOCUMENTS

| | | | | |
|---|---|---|---|---|
| CN | 1693572 | A | 11/2005 | |
| CN | 101725019 | A | 6/2010 | |
| CN | 102105631 | A | 6/2011 | |
| CN | 103221604 | A | 7/2013 | |
| DE | 3113471 | | 10/1982 | |
| DE | 4304226 | | 8/1994 | |
| DE | 102005041145 | A1 * | 3/2007 | D06F 58/206 |
| DE | 102007016077 | | 10/2008 | |
| DE | 102007018787 | | 10/2008 | |
| DE | 102014206650 | A1 * | 10/2015 | D06F 58/206 |
| EP | 0942093 | | 9/1999 | |
| EP | 2075369 | | 7/2009 | |
| EP | 2182104 | | 5/2010 | |
| EP | 2270276 | | 1/2011 | |
| EP | 2284310 | | 2/2011 | |
| EP | 2333141 | | 6/2011 | |
| EP | 2455526 | | 5/2012 | |
| GB | 915647 | | 1/1963 | |
| GB | 1554725 | | 10/1979 | |
| JP | 2004-236965 | A | 8/2004 | |
| JP | 2007-289558 | A | 11/2007 | |
| JP | 2010029521 | | 2/2010 | |

OTHER PUBLICATIONS

Partial European Search Report dated Sep. 12, 2012 in related European Application No. 12150289.2.
Extended European Search Report dated Feb. 1, 2013 in related European Application No. 12150289.2.
International Search Report mailed Nov. 13, 2013 in related International Application No. PCT/EP2013/050039.
Extended European Search Report dated Jun. 14, 2012 in related European Application No. 12150291.8.
International Search Report mailed May 10, 2013 in related International Application No. PCT/EP2012/077012.
Extended European Search Report dated Jun. 20, 2012 in related European Application No. 12150290.0.
International Search Report mailed Feb. 11, 2013 in corresponding International Application No. PCT/EP2013/050042.
Extended European Search Report dated Sep. 19, 2012 in corresponding European Application No. 12150292.6.
Nov. 30, 2015 (CN)—Office Action—App 201380004838.1—Eng Tran.

* cited by examiner

APPLIANCE FOR DRYING LAUNDRY

BACKGROUND OF THE INVENTION

1. Field of the Invention

The present invention generally relates to the field of household appliances for laundry and garments treatment. In particular, the present invention relates to appliances for drying laundry, such as laundry dryers and combined washers/dryers.

2. Discussion of the Related Art

Appliances for drying laundry are adapted to dry clothes, garments, laundry in general, by circulating hot, dry air within a tumbler or drum. The drum is rotatable within a machine external casing or cabinet, and is designed to contain the items to be dried. The rotation of the drum causes agitation (tumbling) of the items to be dried, while they are hit by the drying air flow.

Combined laundry washer/dryer appliances combine the features of a washing machine with those of a dryer. In a washer/dryer, the drum is rotatable within a washing tub which is accommodated within a machine external casing or cabinet.

In a known type of laundry dryers and washers/dryers, also referred to as "condenser dryer", the drying air flow is typically caused to pass through the drum, exiting therefrom from a drying air outlet, then it passes through a moisture condensing system, where the humid, moisture-laden air is at least partially dehydrated, dried, and the dried air flow is heated up by means of a heating arrangement; the heated drying air flow then re-enters into, and passes again through the drum, and repeats the cycle.

While in some known condenser laundry dryers and washers/dryers the moisture condensing system is an air-air heat exchanger, exploiting air taken in from the outside for cooling down the drying air (and thus cause the condensation of the moisture), other known dryers and washers/dryers exploit a heat pump to dehydrate the drying air flow. In these "heat pump dryers", the heating of the drying air may be performed by the heat pump itself. An example of heat pump laundry dryer can be found in EP 2270276.

SUMMARY OF SELECTED INVENTIVE ASPECTS

The Applicant has faced the problem of devising an appliance for drying laundry which is flexible in terms of choices made available to the user for the selection of laundry treatment cycles, particularly laundry drying cycles.

According to an aspect of the present invention, there is provided an appliance for drying laundry, such as a laundry dryer or a washer/dryer, including a drying-air moisture-condensing system comprising a heat pump system with a variable-output compressor having a compression mechanism and an electric motor for driving the compression mechanism; a controller is provided in the appliance to vary the rotational speed of the electric motor, wherein the controller is adapted to vary the rotational speed of the electric motor so as to adjust the rotational speed of the compression mechanism in order to maintain constant a power absorbed by the compressor during at least a portion of a drying cycle.

Said portion of the drying cycle is preferably subsequent to an initial transient phase of the drying cycle after the activation of the compressor wherein the power absorbed by the compressor increases.

Said portion of the drying cycle may for example be a portion of the drying cycle after a time interval has elapsed from the compressor activation, and may for example be 30%-100%, or for 40%-90%, or for 50%-80%, or for 60%-70% of the remaining portion of the laundry drying cycle after a time interval has elapsed from the compressor activation.

Said time interval elapsed from the compressor activation is at least the time interval necessary to the heat pump to reach a steady-state operation after it is started, and for example it may be at least 10, or 15, or 20, or 25, or 30 minutes.

After said initial transient phase of the drying cycle after the compressor activation, the compressor absorbed power may stay constant for the remaining of the drying cycle, and the rotational speed of the compression mechanism may monotonically decrease, possibly for at least a portion of the drying cycle.

"To maintain constant the power absorbed by the compressor during at least a portion of a drying cycle" may mean that the controller controls the compressor in such a way that the compressor absorbed power is, in at least one time interval of said portion of a drying cycle, essentially constant at one value out of a discrete series of admissible values (for example, in two time intervals of said portion of a drying cycle, the compressor absorbed power may be kept constant but at different levels).

In embodiments of the present invention, the laundry drying appliance may further be adapted to perform the drying cycle according to at least a first and a second drying modes; in the first drying mode, the compressor power during said portion of the drying cycle has a first constant value, whereas in the second drying mode the compressor power during said portion of the drying cycle has a second constant value which is higher than the first value.

In embodiments of the present invention, the appliance may be further adapted to perform the drying cycle (in alternative or in addition to the second drying mode) according to at least a third drying mode, wherein in the third drying mode, the compressor absorbed power during a portion of the drying cycle has a third constant value which is lower than the first value.

Preferably, a command input means (e.g., a push-button, either a physical button or a virtual touch-button of a touch screen), distinct from a laundry drying cycle selector, is provided on a appliance user interface to enable the user to select the second and/or third drying modes.

BRIEF DESCRIPTION OF THE DRAWINGS

These and other features and advantages of the present invention will be better understood by reading the following detailed description of some embodiments thereof, provided merely by way of non-limitative examples, description that, for better intelligibility, should be read in conjunction with the attached drawings, wherein.

DETAILED DESCRIPTION OF EMBODIMENTS OF THE INVENTION

Figure 1:
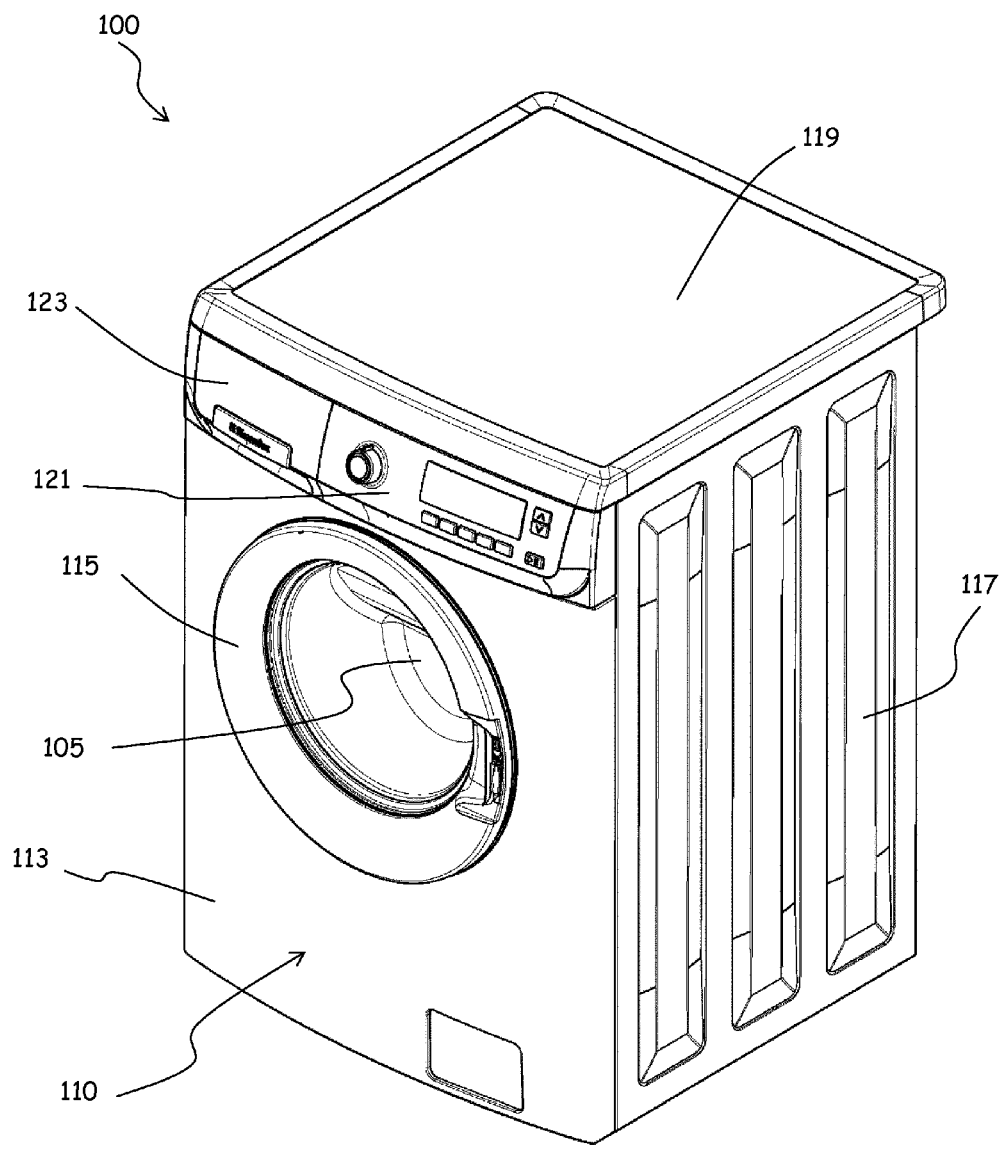
FIG. 1 is a perspective view from the front of an appliance for drying laundry according to an embodiment of the present invention.

With reference to the drawings, a laundry drying appliance, for example a laundry washer/dryer, according to an embodiment of the present invention is depicted in FIG. 1 in perspective from the front. The laundry dryer, globally denoted as 100, comprises a laundry treatment chamber 105 for accommodating the items to be washed and/or dried such as clothes, garments, linen, and similar laundry item. Preferably the laundry treatment chamber 105 includes a drum rotatably mounted inside the machine casing or cabinet 110, and in case of a dryer with washing functionality (i.e., a laundry washer/dryer) the drum is arranged within a tub housed in the machine casing or cabinet 110.

The cabinet 110 is generically a parallelepiped in shape, and has a front wall 113, two side walls 117, a rear wall, a basement and a top 119. The front wall 113 is provided with an opening for accessing the laundry treatment chamber 105 and with an associated door 115 for closing the opening. In the upper part of the front wall 113, a machine control panel (user interface) 121 is located, and (since in the herein considered exemplary invention embodiment the laundry dryer 100 is a dryer with washing functionality, i.e. a washer/dryer), aside the control panel 121, there is a drawer 123, which is part of a washing treatment products dispensing arrangement, for loading laundry washing treatment products, like detergents and softeners. The top 119 closes the cabinet 110 from above, and may also define a worktop.

In the laundry dryer 100, when operated in dryer mode, drying air is typically caused to flow through the laundry treatment chamber 105, where the items to be dried are contained, and are caused to tumble by the drum rotation. After exiting the laundry treatment chamber 105, the flow of moisture-laden drying air passes through a moisture condensing system, where the humid, moisture-laden drying air is (at least partially) dried, dehydrated, and the dehydrated air flow is then heated and caused to pass again through the laundry treatment chamber 105, repeating the cycle.

Figure 2:
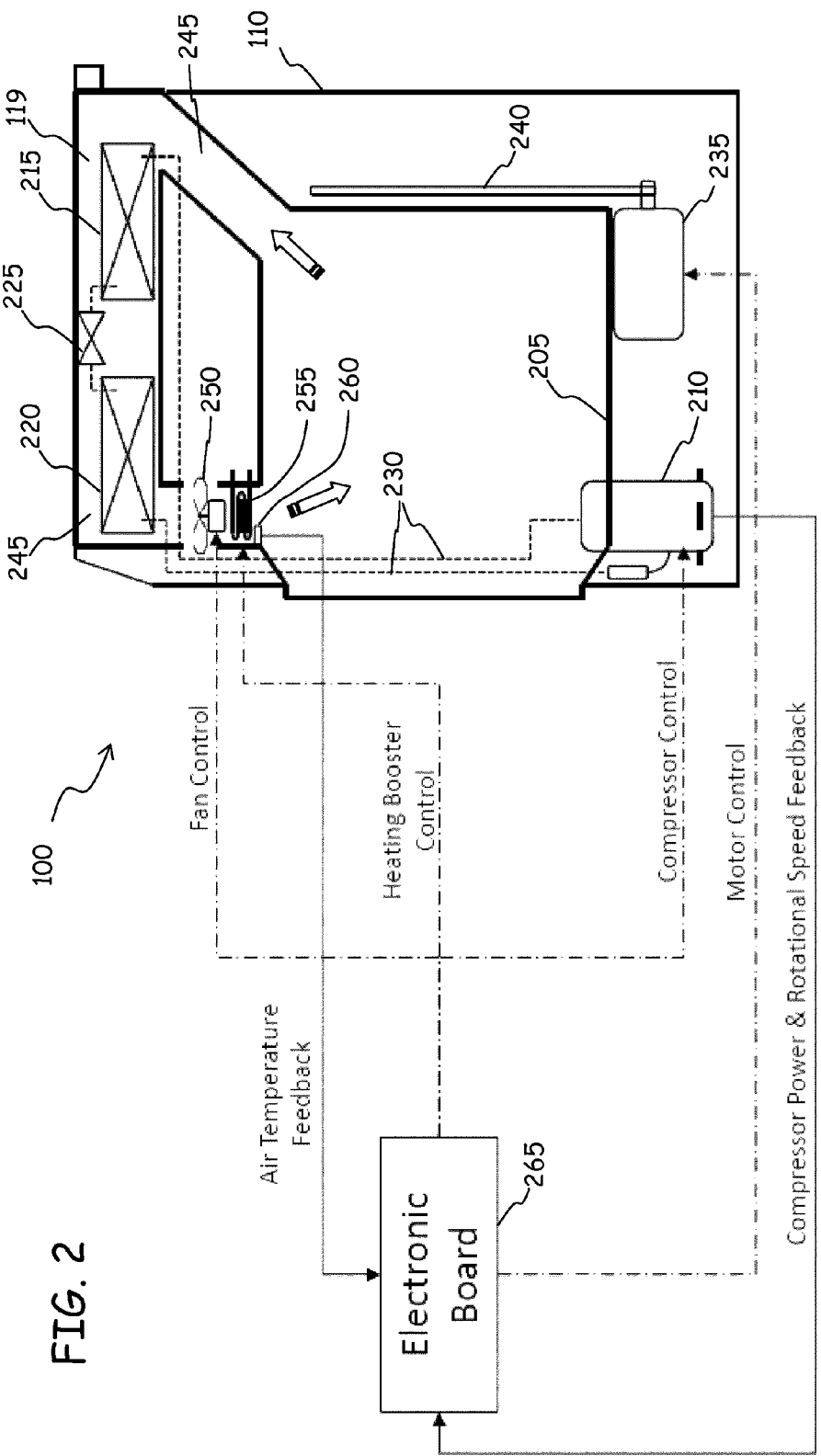
FIG. 2 schematically shows some components of the appliance of FIG. 1, useful for understanding the present invention.

Some of the components of the laundry dryer of FIG. 1 which are useful for understanding the invention embodiments described in the following are shown in the schematics of FIG. 2, where (in addition to the components already mentioned in connection with FIG. 1) reference numeral 205 denotes the tub; reference numeral 210 denotes a compressor of the heat pump forming the moisture condensing system for the moisture-laden drying air; reference numeral 215 denotes a first heat exchanger, which in the example here considered forms the heat pump evaporator for cooling the drying air and heating the refrigerant; reference numeral 220 denotes a second heat exchanger, which in the example here considered forms the heat pump condenser for heating the drying air and cooling the refrigerant; reference numeral 225 denotes expansion means (e.g., capillary tube, expansion valve) between the evaporator 215 and the condenser 220 of the heat pump; the dashed lines 230 denote the heat pump refrigerant fluid circuit. More generally, the compressor 210, the first heat exchanger 215, the expansion means 225 and the second heat exchanger 220 form a refrigerant circuit of the heat pump, which is subdivided into a high pressure portion and a low pressure portion: the high pressure portion extends from the outlet of the compressor 210 via the first heat exchanger 215 to the inlet of the expansion means 225, whereas the low pressure portion extends from the outlet of the expansion means 225 via the second heat exchanger 220 to the inlet of the compressor 210. In the considered example, the first heat exchanger 215 acts as an evaporator, and the second heat exchanger 220 acts as a condenser; however, when the refrigerant operates at least at the critical pressure in the high pressure portion of the refrigerant circuit, then the first heat exchanger 215 acts as a gas cooler, since the refrigerant is in the gaseous state during the cycle; similarly, when the refrigerant operates at least at the critical pressure in the low pressure portion of the refrigerant circuit, then the second heat exchanger 220 acts as a gas heater, since the refrigerant is in the gaseous state during the cycle.

Still in FIG. 2, reference numeral 235 denotes the motor for rotating the drum (not shown in FIG. 2) and reference numeral 240 denotes the associated belt transmission (however, also a drum "direct drive" is conceivable, with the motor shaft directly coupled to the drum). Reference numeral 245 denotes a drying-air recirculation path, external to the laundry treatment chamber 105 and to the tub 205, and which, in an embodiment of the present invention, advantageously arranged mostly inside the top 119. Reference numeral 250 denotes a drying-air propeller, for example a recirculation fan, which promotes the recirculation of the drying air in the laundry treatment chamber 105 and the drying-air recirculation path 245. Reference numeral 255 denotes a Joule-effect drying air heater, for example one (or, possibly, more than one) electric resistor that, according to the present invention, is provided in the drying-air recirculation path 245 for boosting the drying air heating and arranged downstream the second heat exchanger 220, as will be explained in detail in the following; reference numeral 260 denotes a drying air temperature sensor or probe, which, according to an embodiment of the present invention, is provided in the drying-air recirculation path 245, preferably downstream the drying air heating resistor 255, even more preferably where the drying-air recirculation path 245 opens into the laundry treatment chamber 105, at the inlet of the laundry treatment chamber 105, for sensing the drying-air temperature before it enters into the laundry treatment chamber.

Reference numeral 265 denotes a machine control unit, for example an electronic control board, which governs the machine operation, and inter alia controls the motor 235, the compressor 210, the fan 250, the drying air heating resistor 255, and which receives the drying air temperature readings from the drying air temperature probe 260. The control unit 265 receives inputs from the control panel (user interface) 121, by means of which the user may e.g. set the desired laundry drying (or washing/drying) program or cycle, as well as set options for the operation of the machine (as described in greater detail in the following).

The control unit 265 may be a programmable electronic control unit, for example comprising a microcontroller or a microprocessor, which is adapted to execute a program stored in a program memory thereof.

In an advantageous but not limiting embodiment of the present invention, the compressor 210 is a variable-output compressor, and the control unit 265 can control the compressor output by controlling at least one compressor quantity affecting the operation of the compressor, such as for example the rotational speed of the compressor, a frequency of the supply current/voltage of the compressor motor, an absorbed power or current absorbed by the compressor in operation. For example, the control unit 265 may control the compressor 210 so as to maintain a desired level of absorbed power (the control unit 265 preferably receives from the compressor 210 a feedback about the current rotational speed and/or the current electric power consumption). Or (and) the control unit 265 may control an inverter (or other control system) adapted to vary the speed of an electric motor, so that the inverter controls the frequency of the current or voltage supplying the compressor motor in order to vary or maintain at a desired level the compressor rotational speed or the compressor power absorbed.

Possibly, the compression mechanism of the compressor, and the electric motor driving it, are contained in a hermetic casing. The compression mechanism may be of the scroll type or of the rotary type.

Possibly, but not limitatively, the fan 250 is a variable-speed fan, and the control unit 265 can control the fan rotational speed.

The heat pump used as a means for condensing the moisture contained in the drying air returning from the laundry treatment chamber 105 is also able to heat up the drying air after it has been de-humidified (the condenser 220 downstream the evaporator 215 has such a function). However, in the initial phases of a laundry drying cycle, the heat pump has not yet reached the full working temperatures, and for example the condenser 220 is not yet able to heat the drying air up to the desired temperature (which may depend on the specific drying cycle selected by the user), so that the presence of the drying air heating resistor 225 is useful to speed up the heating of the drying air, making it to reach the proper temperature in a lower time than in the case the drying air is only heated up by the condenser 220, thereby reducing the overall drying time. Of course, the energization of the drying air heating resistor 225 consumes electric energy: there is thus a trade off between laundry drying performances (e.g., laundry drying time) and energy consumption.

According to the present invention, as will be described in detail in the following, there is provided a solution thanks to which the user is granted the choice to have the machine activate the drying air heating resistor 225, for speeding up the drying air heating at least in the initial phases of a laundry drying cycle (when the heat pump as a whole, and in particular the condenser 220 is not yet at the full working temperature), and, in a preferred embodiment of the present invention, having the machine control unit 265 control the proper time for de-activating the drying air heating resistor 225.

Figure 3:
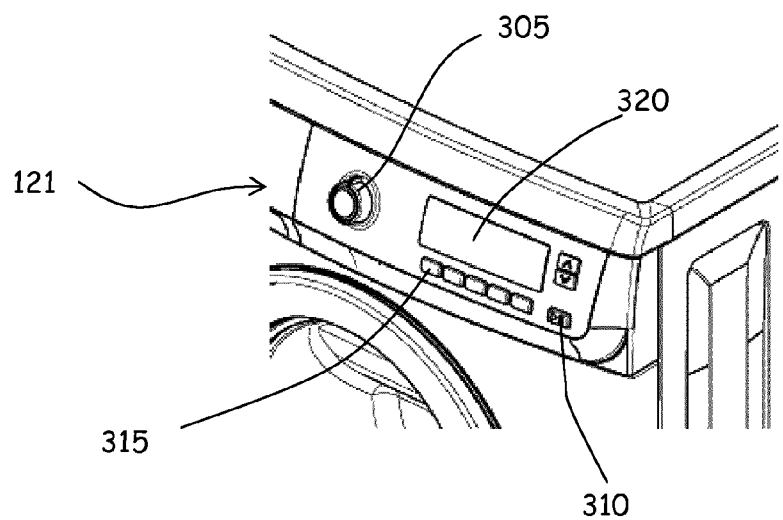
FIG. 3 shows a detail of a user interface of the appliance of FIG. 1.

As shown in FIG. 3, according to an embodiment of the present invention, the machine control panel (user interface) 121, in addition to a program or cycle selector 305 (for example, a usual rotary selector, through which the user can select the laundry washing and/or drying cycle, for example according to the nature of the textiles to be treated) and a cycle start button (a pushbutton or a touchbutton) 310 (which, after selecting the desired laundry washing and/or drying cycle by means of the cycle selector 305, the user can push to start the machine operation), is provided with an additional button (for example, a pushbutton or a touchbutton) 315, by means of which the user may select the activation of the drying air heating resistor 255. The control panel 121 may advantageously comprise also a display 320, for displaying to the user information relevant to the machine operation (e.g., the specific laundry washing and/or drying cycle selected by the user, as well as other options that the user may set); the display 320 may be a touch screen, and the button 315 may be an area of the touch screen.

Advantageously, the user, by pushing the button 315 for selecting the activation of the drying air heating resistor 255, and then starting the machine by e.g. pushing the start button 310, may cause the control unit 265 to energize the drying air heating resistor 255 from the very beginning of the selected laundry drying cycle (which may be a laundry drying cycle following a selected laundry washing cycle, or a laundry treatment cycle consisting only in a drying cycle without washing cycle before—this latter is always the case for a machine 100 that does not implement laundry washing functionalities), so as to speed up the drying air heating when the heat pump, particularly the condenser 220 has not yet reached its working temperature.

In response to the user selection of the activation of the drying air heating resistor 255, the control unit 265 causes the heating resistor 255 to be energized since the beginning of the laundry drying cycle.

Preferably, after the user has started the machine by e.g. pushing the start button 310, any further push of the button 315 by the user is neglected by the control unit 265. Thus, if the user forgot to push the button 315, or if the user decides to push the button 315 after he/she has started the machine by pushing the start button 310, the user cannot lately instruct the control unit 265 to activate the heating resistor 255. Indeed, it may not be very useful to activate the drying air heating resistor 255 after the heat pump and the condenser 220 have already reached their full working temperatures.

Preferably, in order not to waste energy and possibly damage the items being dried, the control unit 265 performs a control of the drying air temperature, in order to prevent it from excessively rising.

Advantageously, the control unit 265 exploits the information provided by the drying air temperature probe 260 to determine the temperature of the drying air at the entrance into the laundry treatment chamber 105. The applicant has found that, measuring the temperature of the drying air at the entrance into the laundry treatment chamber 105 (where there is the laundry to be dried) provides an effective control of the drying air temperature, because in this way it is the temperature of the drying air that is going to hit the items being dried that is directly measured; the reaction to an excessive increase of the drying air temperature is fast.

Preferably, the control unit 265 constantly or periodically compares the measure of the drying air temperature provided by the temperature probe 260 to a predetermined temperature threshold (which preferably depends on the laundry drying cycle selected by the user, so as to be adapted to the treatment of the specific type of textiles under treatment), and when the temperature threshold is reached or trespassed, the control unit 265 automatically de-energizes the drying air heating resistor 255 (without the necessity that the user takes care of de-activating the heating resistor 255 by pushing again the button 315): from then on, the drying air is just heated up by the condenser 220 (which may be controlled in order to maintain the proper drying air temperature, depending on the specific type of textiles under treatment). In this way, the user is relieved from the burden of controlling the progress of the laundry drying cycle.

Figure 4:
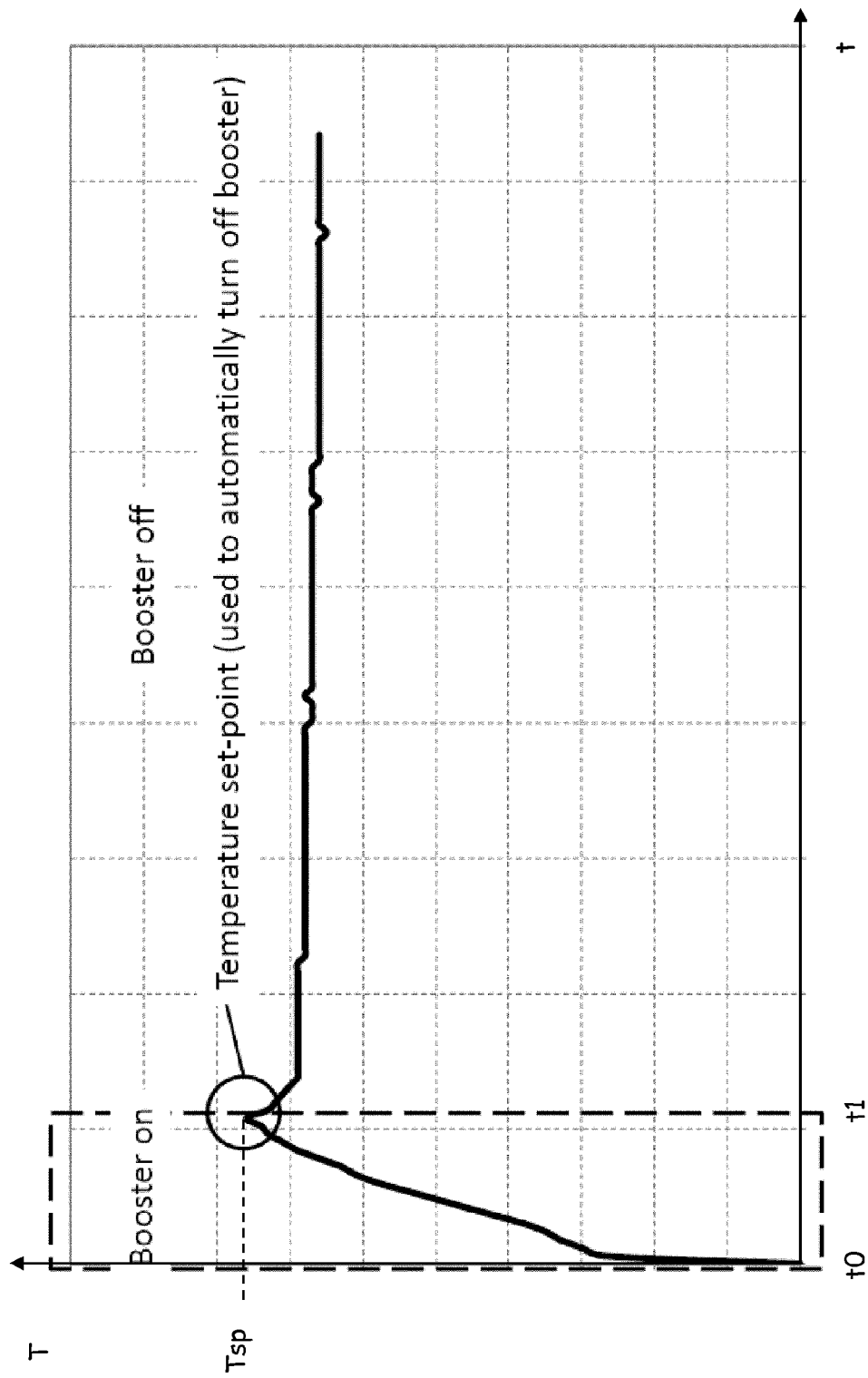
FIGS. 4, 5, 6A and 6B are time diagrams showing possible ways of working of the appliance of FIG. 1, in accordance to embodiments of the present invention.

FIG. 4 is a time diagram showing the control of the energization of the drying air heating resistor 255 by the control unit 265, in an embodiment of the present invention. In FIG. 4, the abscissa represents the time t, whereas the ordinate represents the temperature T of the drying air as measured by the drying air temperature probe 260. It is assumed that the user has selected the activation of the drying air heating resistor 255 (by pushing the button 315) before starting the machine (for example, by pushing the start button 310). The drying cycle starts at instant t0. The drying air heating resistor 255 is energized, and the temperature of the drying air (as measured by the drying air temperature probe 260) rises quickly thanks to the boosting action of the drying air heating resistor 255. When the drying air temperature reaches a predetermined temperature set point Tsp (which may depend on the particular drying cycle selected by the user, e.g. through the cycle selector 305, so that, for example, the temperature set point is different for different kinds of textiles), the control unit 265 de-energizes the drying air heating resistor 255: at the instant t1 the drying air heating resistor 255 is thus de-energized, the drying air temperature lowers a bit (because the boosting action of the drying air heating resistor 255 ceases), and from then on the drying air is heated by the condenser 220 only (which in the meanwhile has reached its full working temperature).

Preferably, the control unit 265 is adapted to perform a check of consistency of the user choice of activation of the heating resistor 255 with the specific drying cycle set by the user through the cycle selector 305. For example, if the control unit 265 recognizes that the energization of the heating resistor 255 would result in drying air temperatures too high to be compatible with the drying cycle set by the user (for example, drying air temperatures that might damage the textiles to be dried), the control unit 265 may disregard the pushing by the user of the button 315, and keep the heating resistor 255 deactivated irrespective of the user selection.

According to a different aspect of the present invention that can be implemented in addition or alternatively to the solution described above, the applicant has found that equipping the machine with a variable-output compressor 220 and/or a variable speed drying air recirculation fan 250 enables enhancing the flexibility of the laundry drying cycles that can be performed by the appliance, by implementing a variety of options for the execution of the laundry drying cycles.

For example, it is possible to implement "Quick Dry" drying modes, enabling a fast drying of the laundry (at the cost of a slightly higher electric power consumption), "Eco Dry" drying modes, characterized by a trade-off between power consumption and laundry drying speed, and "Silent Dry" drying modes, in which the machine operates at a very low noise generation level (and consumes low electric power, but the time necessary to dry the laundry is longer).

The user may select which of the "Quick Dry"/"Eco Dry"/"Silent Dry" drying mode he/she wants the machine to perform in a way similar to the selection of whether to activate the drying air heating resistor 255, i.e. by pushing one or more buttons of the user interface 121 (possibly, by repeatedly pushing the button 315).

For example, the "Quick Dry"/"Eco Dry"/"Silent Dry" drying mode may be an option to be applied to any one (or to at least a subset) of the drying cycles that are implemented in the machine and that the user may select by means of the cycle selector 305.

For example, by selecting to perform a drying cycle in the "Quick Dry" drying mode the machine:

energizes the drying air heating resistor 255 at the beginning of the drying cycle (preferably until the proper temperature set point Tsp is reached);

causes the compressor 220 to operate at a high output level (e.g., at a high rotational speed, or at a high level of power consumption—in which case the compressor rotational speed is varied so as to maintain the high level of compressor power consumption—or at a high frequency of the current/voltage supply); and preferably causes the fan 250 to operate at a high speed.

Controlling the fan 250 to operate at a higher speed allows the drying air to circulate faster, particularly through the heat exchangers 215 and 220 of the heat pump; this increases the heat exchange rate and makes the heat pump operate more efficiently. The drying performance is thus improved, and the drying cycle can be shorter, at the cost of a slightly higher appliance power consumption (due to the fan motor).

Figure 5:
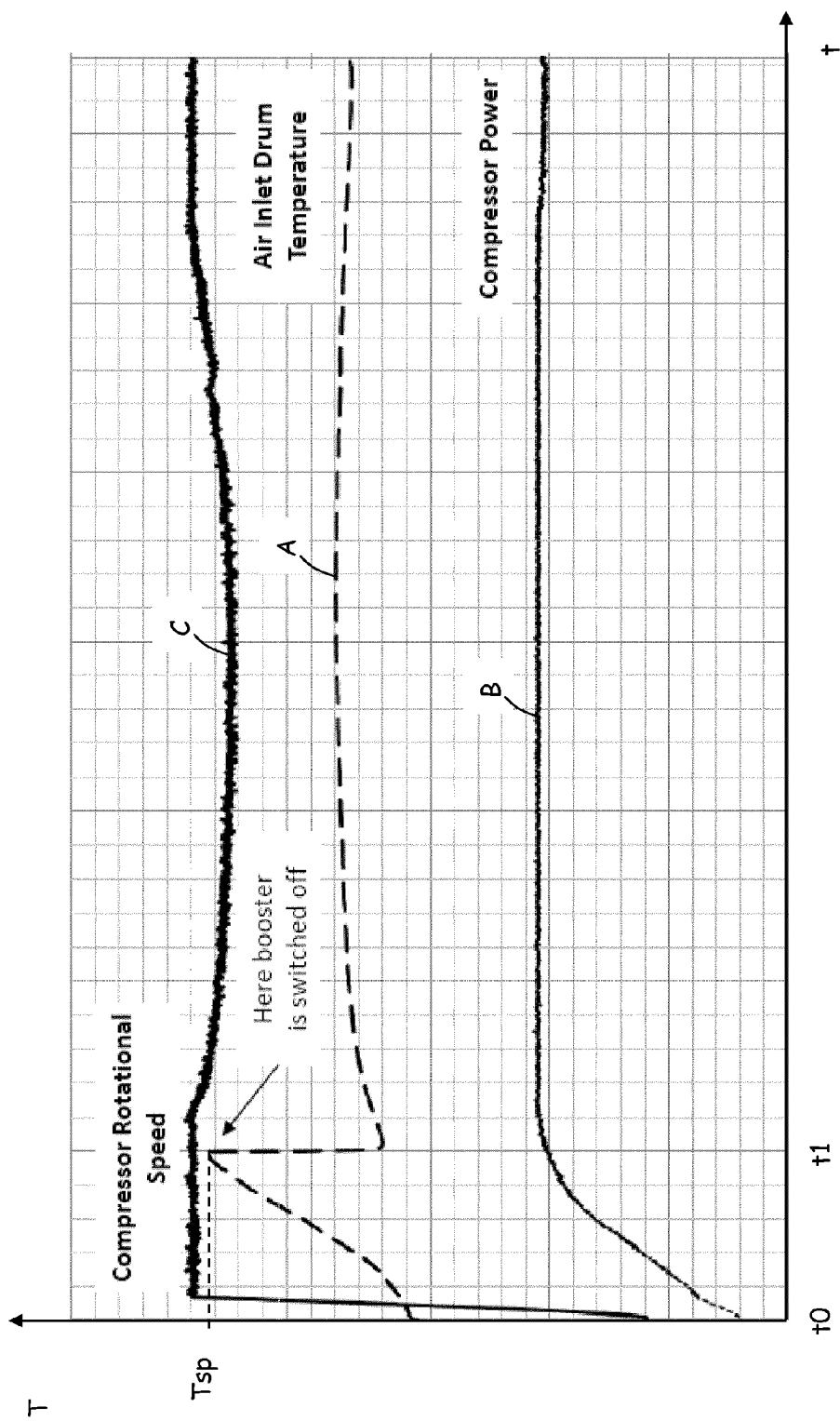

The time diagram of FIG. 5 schematizes what happens during a drying cycle when the "Quick Dry" drying mode option is selected (it is pointed out that in the scenario of FIG. 5 it is assumed, by way of example, that the control unit 265 controls the compressor power consumption so that, after an initial transient, it remains essentially constant at a predetermined level, but the control might also be operated on the compressor rotational speed and/or on the frequency of the supply current/voltage supplied to the compressor motor); as in FIG. 4, the abscissa represents the time t, whereas the ordinate represents the temperature T of the drying air as measured by the drying air temperature probe 260. The (dashed) line A is the drying air temperature, curve B is the compressor power consumption, curve C is the compressor rotational speed. The compressor power consumption (curve B), for at least a part of the drying cycle (in particular, after an initial transient wherein the heat pump system has not yet reached the full temperature/pressure working conditions) more or less stabilizes at a certain steady-state level that is above a predetermined threshold (higher than a corresponding threshold for the "Eco Dry" and "Silent Dry" drying modes); the compressor rotational speed (curve C) varies according to the compressor power level set by the control unit 265.

A laundry drying cycle performed in "Silent Dry" drying mode is for example a laundry drying cycle that calls for:

keeping the drying air heating resistor 255 off;

causing the compressor 220 to operate at a low output level (e.g., low rotational speed or low power consumption—in which case the compressor rotational speed is varied to maintain the low power consumption—, or low supply voltage/current frequency); and preferably preferably causing the fan 250 to operate at a low speed.

The "Silent Dry" drying mode is for example useful for those users who wish to use the machine during nighttime (when the cost of the electric energy may be low): the machine operation is more silent, not to disturb neighbors.

A laundry drying cycle performed in "Eco Dry" drying mode may for example be a drying cycle which calls for:

keeping the drying air heating resistor 255 off;

causing the compressor 220 to operate at an intermediate output level (e.g., intermediate rotational speed/intermediate power consumption/intermediate voltage/current supply frequency, intermediate between the high rotational speed/power/frequency of the "Quick Dry" mode and the low rotational speed/power/frequency of the "Silent Dry" cycle); and preferably preferably causing the fan 250 to operate at an intermediate rotational speed (intermediate between the high rotational speed of the "Quick Dry" drying mode and the low rotational speed of the "Silent Dry" drying mode).

Figure 6A:
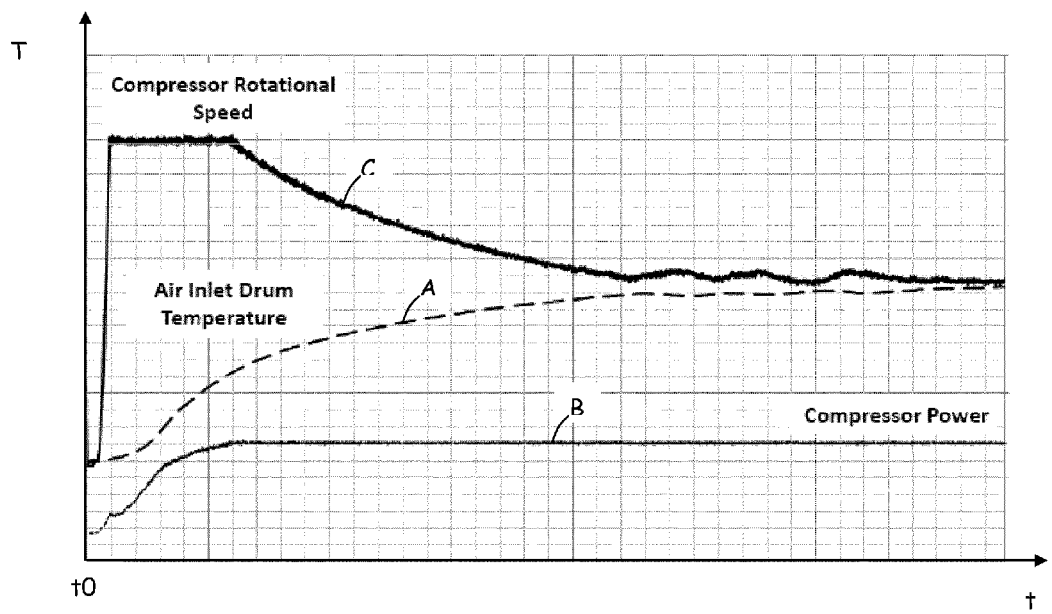

The time diagram of FIG. 6A schematizes what happens during a drying cycle performed in the "Silent Dry" drying mode or in the "Eco Dry" drying mode (also in this case, it is assumed, by way of example, that the control unit 265 controls the compressor power consumption so that, after an initial transient, it remains essentially constant at a predetermined level, but the control might also be operated on the compressor rotational speed and/or on the frequency of the supply current/voltage supplied to the compressor motor). Again, as in FIG. 5, the abscissa represents the time t, whereas the ordinate represents the temperature T of the drying air as measured by the drying air temperature probe 260. The (dashed) line A is the drying air temperature, curve B is the compressor power consumption, curve C is the compressor rotational speed. The compressor power consumption (curve B), for at least a part of the drying cycle (in particular, after an initial transient wherein the heat pump system has not yet reached the full temperature/pressure working conditions) more or less stabilizes at corresponding steady-state levels that are above respective predetermined thresholds (for the "Eco Dry" drying mode, the threshold is lower than the corresponding threshold for the "Quick Dry" mode but higher than the corresponding threshold for the "Silent Dry" mode, whereas for the "Silent Dry" mode the thresholds are the lowest of the three drying modes). The compressor rotational speed (curve C) varies according to the compressor power level set by the control unit 265.

For example, the "Eco Dry" drying mode may be the "default" drying mode that the machine selects to be applied by default to any of the drying cycles selectable by the user through the cycle selector 305. If the user, before starting the machine by pushing the start button 310, selects the "Quick Dry" drying mode (by pushing the button 315), the machine, instead of running the selected drying cycle in the default mode, runs it with the drying air heating resistor 255 on (at the beginning of the cycle), the compressor 220 operating at high output (even after the initial transient) and, preferably, the fan 250 rotating fast: the selected drying cycle will be completed quicker than in the default, "Eco Dry" drying mode. If instead the user, before starting the machine by pushing the start button 310, selects the "Silent Dry" drying mode (by pushing the button 315 or another button), the machine, instead of running the selected drying cycle in the default mode, runs it with the compressor 220 operating at low output (after the initial transient) and, preferably, the fan 250 rotating slow: the selected drying cycle will be completed in a longer time than in the default, "Eco Dry" drying mode (and obviously longer than if the cycle would be performed in "Quick Dry" drying mode). In other words, by selecting the "Quick Dry" drying mode, the user causes the machine to perform the selected drying cycle in such a way that it lasts less than if the same drying cycle is executed in the default, "Eco Dry" mode; by selecting the "Silent Dry" mode, the user causes the machine to perform the selected drying cycle in such a way that it lasts longer than if the same drying cycle is executed in the default, "Eco Dry" mode.

Figure 6B:
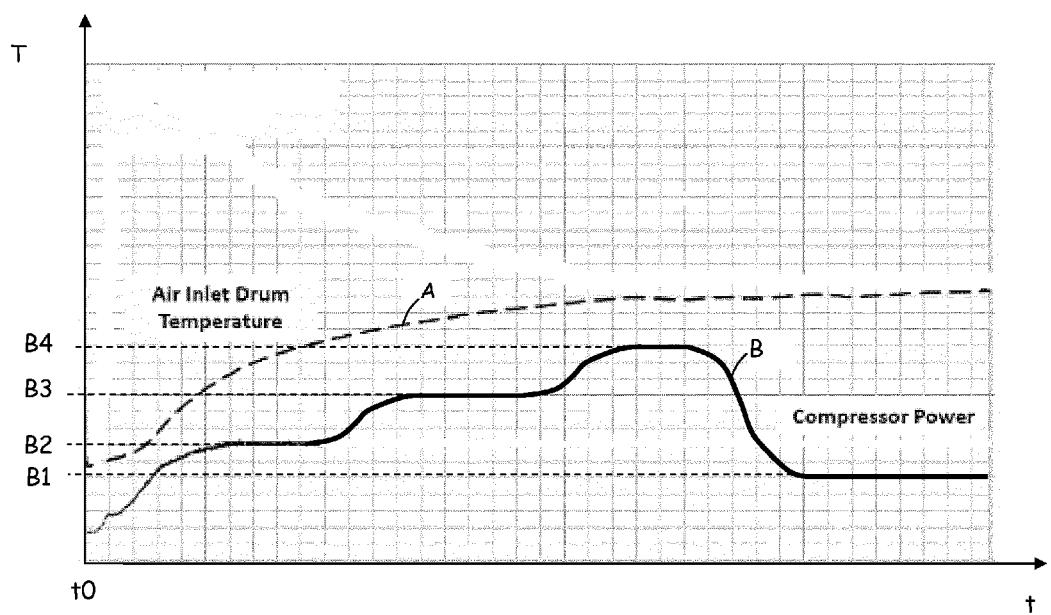
Figure 7:
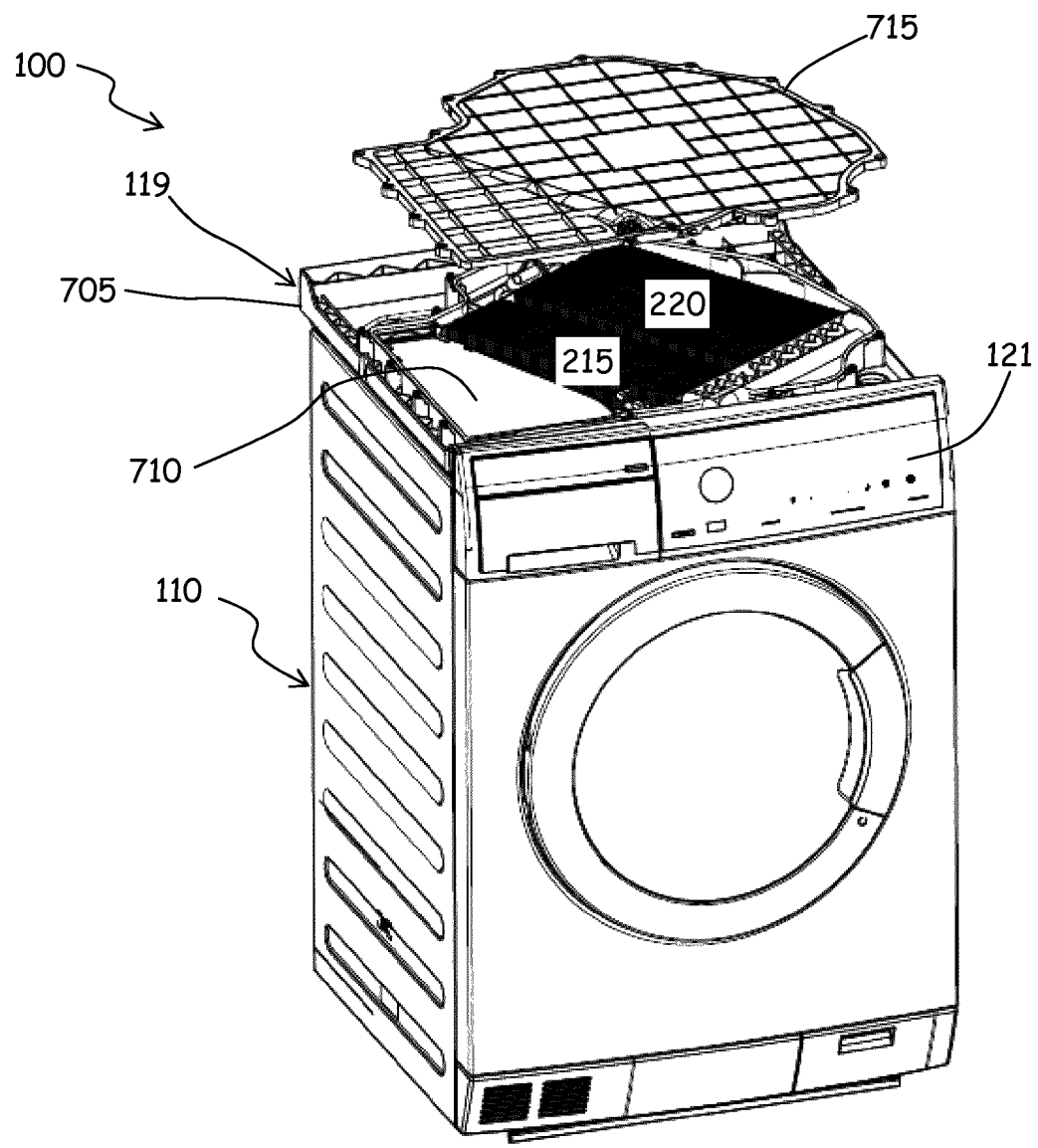
FIGS. 7-9 show constructional details of the appliance of FIG. 1 according to an embodiment of the present invention.
Figure 8:
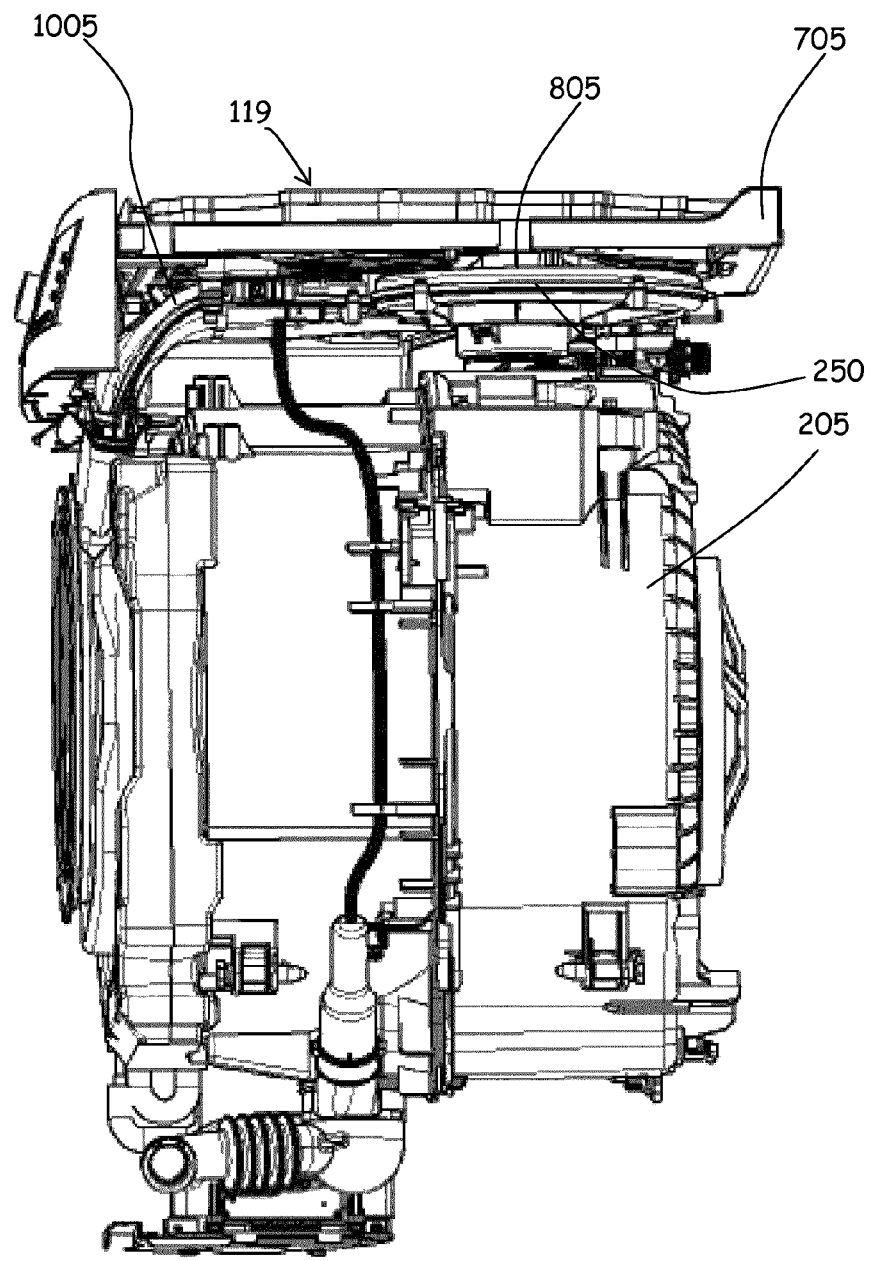
Figure 9:
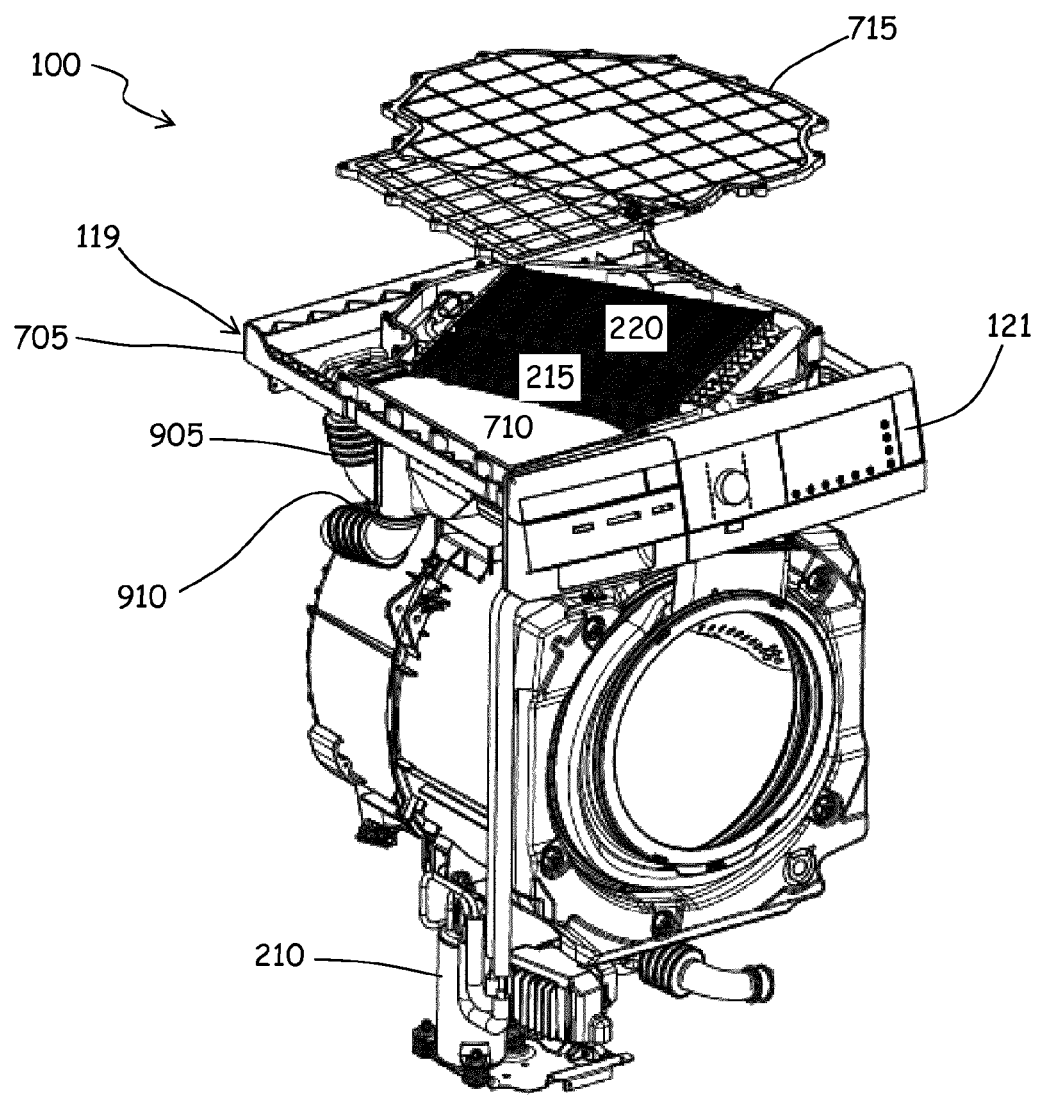

More generally, the compressor output level (i.e., the compressor rotational speed and/or compressor power consumption and/or the voltage/current supply frequency), and, optionally, the fan rotational speed may either vary continuously or they may be controlled to stay at one or more predetermined, discrete levels during the drying cycle (after the initial transient thereof); in particular, the compressor output level is varied to maintain a proper drying air temperature, suitable for the type of textiles under treatment). For example, as depicted in FIG. 6B (in which, as in the preceding diagrams, the abscissa represents the time t, whereas the ordinate represents the temperature T of the drying air as measured by the drying air temperature probe 260, the dashed line A is the drying air temperature, and curve B is the compressor power consumption), the compressor absorbed power may be controlled so that, after the initial transient, it reaches and stays constant for a certain time interval at a level B2, then it raises (with a certain change rate) to a level B3 and stays at such level for another time interval, after which the compressor absorbed power raises again (with a certain change rate) to a level B4 and stays at such level for a certain time, after which the compressor absorbed power falls (with a certain change rate) to a relatively low level B1 and stays at such level till the end of the drying cycle.

In the "Quick Dry" drying mode one or more of the levels of the compressor absorbed power and fan rotational speed stay above the corresponding level(s) of the "Eco Dry" drying mode, and in the "Silent Dry" drying mode one or more of the levels of the compressor absorbed power and fan rotational speed stay below the corresponding level(s) of the "Eco Dry" drying mode.

In general, according to another aspect of the present invention there is provided an appliance for drying laundry, like a laundry dryer or a washer/dryer, including a drying-air moisture-condensing system comprising a heat pump system with a variable-output compressor, at least one Joule-effect (electric) heater for boosting the heating of the drying air, and adapted to perform at least one laundry drying cycle in at least a first drying mode, wherein the electric heater is kept de-energized and the compressor is driven to a first compressor mode having a compressor power consumption course (trend over time) and/or a compressor rotational speed course and/or a frequency course of the supply current/voltage of the compressor motor, and at least a second drying mode, wherein the electric heater is kept energized for at least an initial portion of the drying cycle and the compressor is driven to a second compressor mode after the electric heater has been de-energized, the second compressor mode comprising a compressor power consumption course and/or a compressor rotational speed course and/or a frequency course of the supply current/voltage of the compressor motor, wherein for at least a portion of the drying cycle after the electric heater has been de-energized, the compressor power consumption and/or a compressor rotational speed and/or a frequency of the supply current/voltage of the compressor of the second compressor mode is/are higher than the one/s of the first compressor mode.

Preferably, for most of the drying cycle after the electric heater has been de-energized, the compressor power consumption and/or a compressor rotational speed and/or a frequency of the supply current/voltage of the compressor of the second compressor mode is/are higher than the one/s of the first compressor mode.

Preferably, for the whole remaining portion of the drying cycle after the electric heater has been de-energized (i.e., until completion of the drying cycle), the compressor power consumption and/or a compressor rotational speed and/or a frequency of the supply current/voltage of the compressor of the second compressor mode is/are higher than the one/s of the first compressor mode.

"For most of the remaining portion of the laundry treatment cycle" may for example mean for 30%-100%, or for 40%-90%, or for 50%-80%, or for 60%-70% of the remaining portion of the laundry treatment cycle after the Joule-effect heater has been de-energized.

Further, according to another aspect of the present invention, the laundry drying appliance is further adapted to perform the at least one drying cycle according to at least a third drying mode, wherein the electric heater is kept de-energized and the compressor is driven to a third compressor mode having a compressor power consumption course and/or a compressor rotational speed course and/or a frequency course of the supply current/voltage of the compressor motor, wherein for at least a portion of the drying cycle after a time interval has elapsed from the compressor activation, the compressor power consumption and/or a compressor rotational speed and/or a frequency of the supply current/voltage of the compressor of the third compressor mode is/are lower than the one/s of the first compressor mode.

Said time interval may be at least 10, or 15, or 20, or 25, or 30 minutes.

The user may for example activate the second drying mode by pushing the push-button 315.

The third drying mode may for example be activated by the user by pushing the push-button 315 or by means of another actuation device.

According to another aspect of the present invention there is provided an appliance for drying laundry, such as a laundry dryer or a laundry washer/dryer, including a drying-air moisture-condensing system comprising a heat pump system with a variable-output compressor, at least one drying air variable-speed fan, and adapted to perform at least one laundry drying cycle in at least a first drying mode wherein the compressor is driven to a first compressor mode having a compressor power consumption course (trend over time) and/or a compressor rotational speed course and/or a frequency course of the supply current/voltage of the compressor motor and the fan is driven to a first fan mode having a speed course, and at least a second drying mode wherein the compressor is driven to a second compressor mode comprising a compressor power consumption course and/or a compressor rotational speed course and/or a frequency course of the supply current/voltage of the compressor motor and the fan is driven to a second fan mode having a speed course, wherein for at least a portion of the drying cycle, the compressor power consumption and/or a compressor rotational speed and/or a frequency of the supply current/voltage of the compressor of the second compressor mode is/are higher than the one/s of the first compressor mode and the speed of the second fan mode is higher than the speed of the first fan mode Preferably, the above applies after a after a time interval has elapsed from the compressor activation.

Said time interval may be at least 10, or 15, or 20, or 25, or 30 minutes.

The second drying mode may be activated by the user by pushing the push-button 315.

According to another aspect of the present invention, the laundry drying appliance is further adapted to perform the at least one drying cycle according to at least a third drying mode wherein the compressor is driven to a third compressor mode comprising a compressor power consumption course and/or a compressor rotational speed course and/or a frequency course of the supply current/voltage of the compressor motor and the fan is driven to a third fan mode having a speed course, wherein for at least a portion of the drying cycle, the compressor power consumption and/or a compressor rotational speed and/or a frequency of the supply current/voltage of the compressor of the third compressor mode is/are lower than the one/s of the first compressor mode and the speed of the third fan mode is lower that the speed of the first fan mode.

Preferably, the above applies after a time interval has elapsed from the compressor activation.

The Time interval may be at least 10, or 15, or 20, or 25, or 30 minutes.

The third drying mode may be activated by pushing the push-button 315 or by means of another actuation device.

According to another aspect of the present invention, there is provided an appliance for drying laundry, such as a laundry dryer or a washer/dryer, including a drying-air moisture-condensing system comprising a heat pump system with a variable-output compressor having a compression mechanism and an electric motor for driving the compression mechanism; a controller is provided to vary the rotational speed of the electric motor, wherein the controller is adapted to adjust the rotational speed of the compression mechanism so as to maintain constant the power absorbed by the compressor during at least a portion of a drying cycle.

Said portion of the drying cycle is subsequent to an initial transient phase of the drying cycle after the activation of the compressor wherein the power absorbed by the compressor increases.

Possibly, the controller is adapted to adjust the rotational speed of the compression mechanism so as to maintain constant (at one or more of a series of discrete values) the power absorbed by the compressor during at least a portion of a drying cycle.

The laundry drying appliance may further be adapted to perform the drying cycle according to at least a first and a second drying modes; in the first drying mode the compressor power during said portion of the drying cycle has a first constant value, whereas in the second drying mode the compressor power during said portion of the drying cycle has a second constant value which is higher than the first value.

Preferably, a push-button is provided to enable the user to select the second drying mode.

Advantageously, the solution according to the present invention can be implemented in a machine as described for example in the EP application No. 2270276, in which the moisture condensing system is comprised of a heat pump and is almost completely accommodated within the top 119 of the machine (the top 119 being preferably, although not limitatively, a ready-to-mount part that can be mounted as a unique, separate piece onto the machine).

As visible in FIGS. 7-9, 12 and 13, the top 119 comprises a base element 705 (depicted per-se in FIG. 12), which has two openings: a first, inlet opening 1205 in correspondence of an outlet of a drying air return duct 905 (leading drying air exiting the laundry treatment chamber 105), a second, outlet opening 1210 in correspondence of the intake 805 of the fan 250. In the region of the base element 705 near the front-left corner thereof, a defluff filter arrangement 710 is located, for example in the form of a drawer hinged at one end to the base element 705 and pivotable so as to allow its extraction (in a region aside the user interface 121, for example above the drawer 123) for cleaning purposes.

In the central region of the base element 705, there is a seat for accommodating a moisture condensing system comprising the evaporator 215, the condenser 220 and the expansion means 225. The compressor 210 is for example located at the bottom of the cabinet 110, attached to the appliance basement, and is fluidly connected to the moisture condensing system accommodated in the top 119 by means of pipes.

The base element 705 is covered by a-panels, like the panel 715, including a top panel that closes the top 119 from above. The base element 705 and the panels covering it define a first air path that conveys the drying air coming from the return air duct 905 to the defluff filter 710, preventing the drying air from directly entering into the evaporator 215, and a second air path that, from the defluff filter, goes to the condenser 220 passing through the evaporator 215. The drying air (coming from the drum) thus passes through the defluff filter 710, and then enters into the evaporator 215. In the region of the base element 705 under the evaporator 215, mist/condense water droplets separation means are preferably provided, and the base element 705 has a baffle 1215 that separates the area 1220 of the base element 705 where the evaporator 215 is accommodated, from the area 1225 where the condenser 220 is placed, the baffle 1215 forming a barrier for the condense water that drops from the drying air when it passes through the evaporator 215. A condense water drainage hole 1230 is preferably formed in the base element 705, the drainage hole being fluidly connected, through a conduit (not shown), to a washing liquid discharge pump of the machine.

The top 119, once assembled, forms a unit that is ready to be mounted to the cabinet 110, simply by placing it in the correct alignment, so that the openings 1205 and 1210 formed in the base element 705 of the top 119 matches the outlet of the return air duct 905 and the intake 805 of the fan 205.

Figure 10:
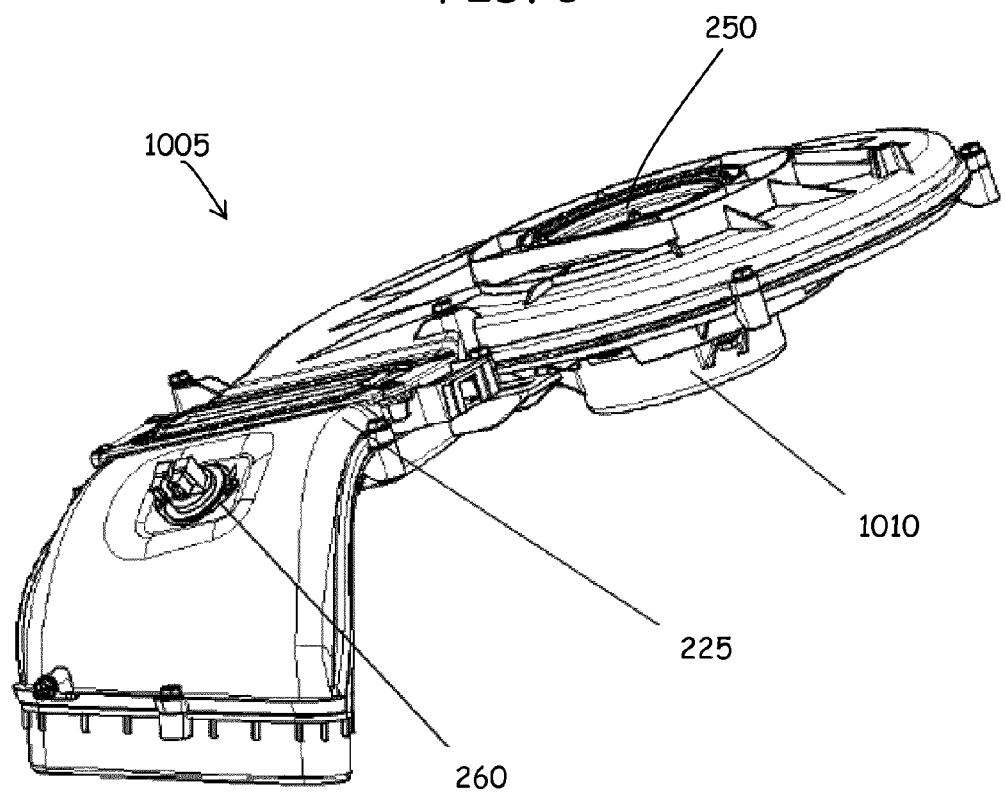
FIG. 10 shows a detail of a drying air propeller assembly according to an embodiment of the present invention.
Figure 11:
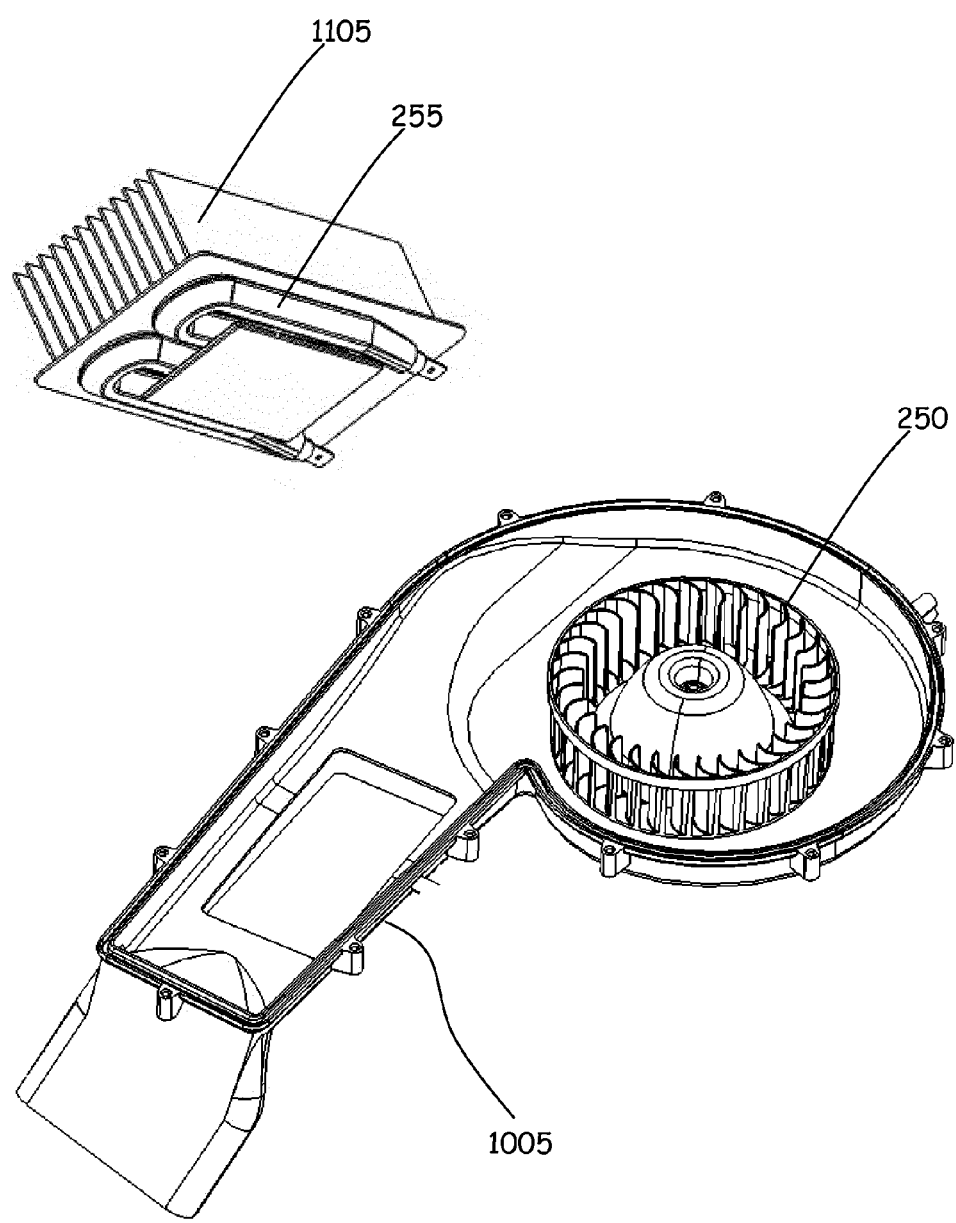
FIG. 11 shows in exploded view a detail of a drying air propeller according to an embodiment of the present invention.

As visible in FIG. 10, the drying air heating resistor 225 is advantageously placed inside an air duct 1005, being part of the drying-air recirculation path 245, and which runs at the top of the cabinet 110, just under the base element 705 of the top 119, from the rear to the front thereof, and conveys the drying air from the fan 250 into the laundry treatment chamber 105 accommodated therein. As shown in FIG. 10, the air duct 1005 is preferably shaped so as to also define a housing for the fan 250 and supports a fan motor 1010; the air duct 1005 is advantageously made of two half-shells, and is fixedly, rigidly mounted to the machine cabinet 110. The drying air heating resistor 225 is housed within the air duct 1005 downstream the fan 250. As depicted in FIG. 11, the drying air heating resistor 225 may be associated with a heat dissipater/radiator 1105 having fins, that is accommodated within the air duct 1005: in this way, the drying air heating effect is enhanced. Also the drying air temperature probe 260 is preferably accommodated in the air duct 1005, downstream the drying air heating resistor 225. The drying air temperature probe 260 may for example comprise an NTC (Negative Temperature Coefficient) resistor. More generally (especially in a dryer without washing functionalities), the drying air heating resistor 225 may be located elsewhere (but preferably always downstream the condenser).

Figure 12:
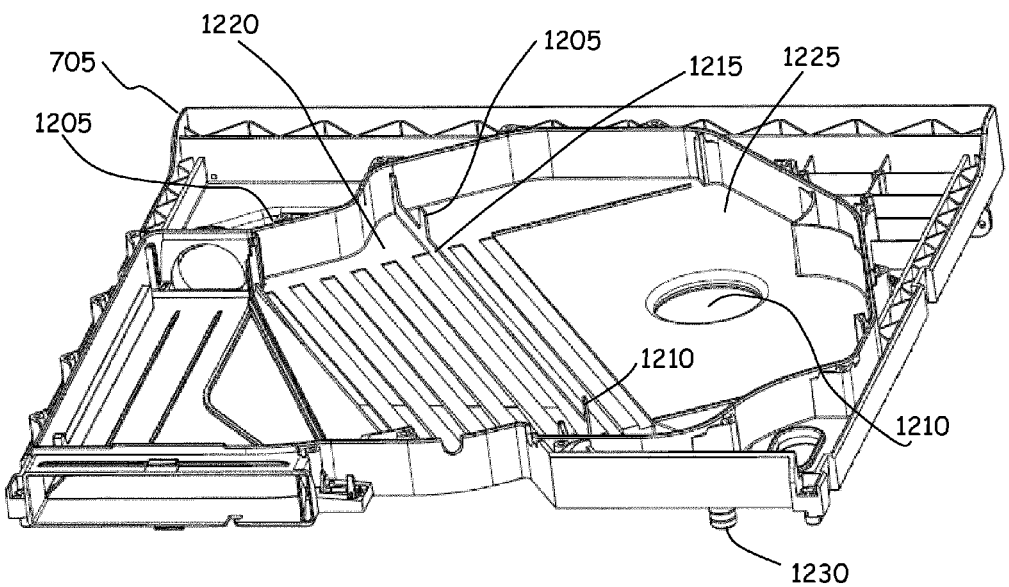
FIGS. 12-14 shows constructional details of an evaporator and condenser assembly exploitable in the appliance of FIGS. 7-9, in an embodiment of the present invention.
Figure 13:
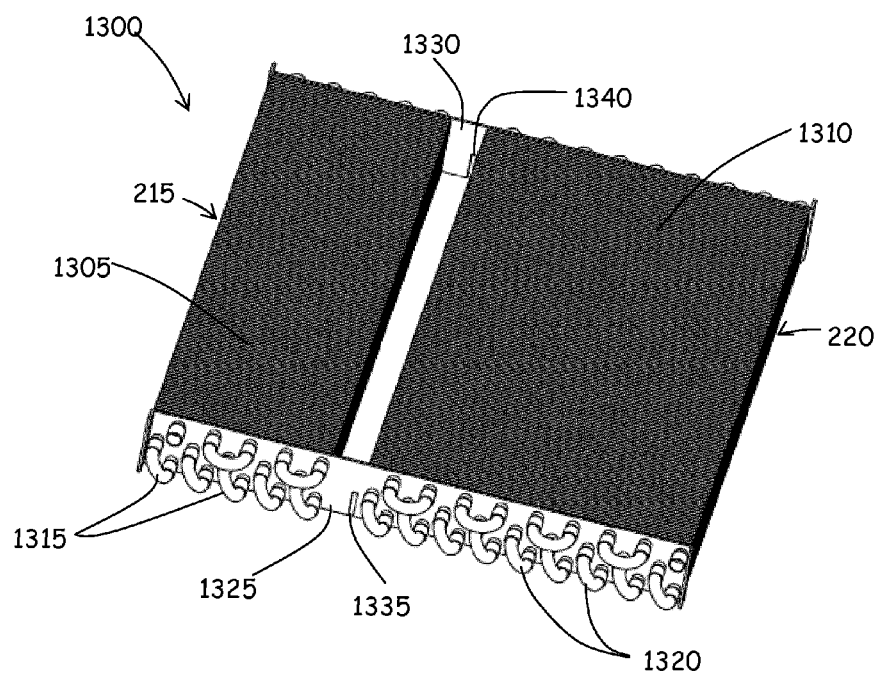
Figure 14:
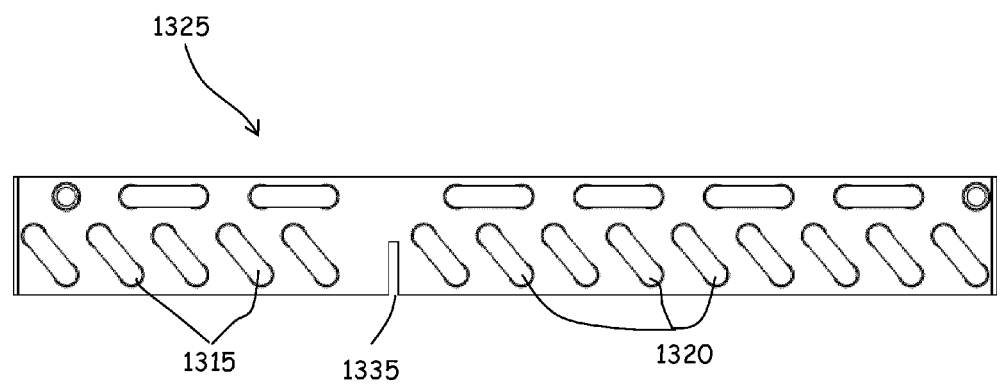

FIGS. 12-14 show constructional details of an evaporator and condenser assembly which can be advantageously used in a heat-pump laundry dryer or washer/dryer, like for example, but not necessarily, the machine previously described.

The evaporator 215 and the condenser 220 are formed as two initially separate heat exchanger bodies, each one comprising a plurality of heat exchange fins 1305, 1310 in packed arrangement crossed by the piping 1315, 1320 for the heat pump refrigerant fluid, and are then joined to each other to form a unique, single body 1300 by means of two plates 1325 and 1330, for example in sheet metal, shaped as depicted in FIG. 14, that are provided with holes for the passage of the piping, and that are mounted to the evaporator 215 and condenser 220 in such a way as to extend parallel to the direction of the refrigerant fluid flow. A cut 1335, 1340 is provided in each of the plates 1325 and 1330 in an intermediate position thereof, where there is a gap between the evaporator and the condenser (in said gap, no fins are present), and such cut is, in operation, engaged by a respective projection 1205, 1210 formed in the baffle 1215 that separates the area 1220 of the base element 705 where the evaporator 215 is accommodated, from the area 1225 where the condenser 220 is placed, and which forms a barrier for the condense water that drops from the drying air when it passes through the evaporator 215; the engagement of the baffle projections 1205 and 1210 in the cuts 1335 and 1340 performs a centering action that facilitates the positioning of the evaporator and condenser single body 1300 and ensures that the correct position is maintained during the appliance handling and operation.

The plates 1325 and 1330 are preferably made in a same material as the heat-exchange fins but having a greater thickness, and/or the joining member may be made in a material different from the material of the heat-exchange fins, to be more resistant. This facilitates the handling of the single body and prevents damaging of the packs of heat-exchange fins.

Figure 15:
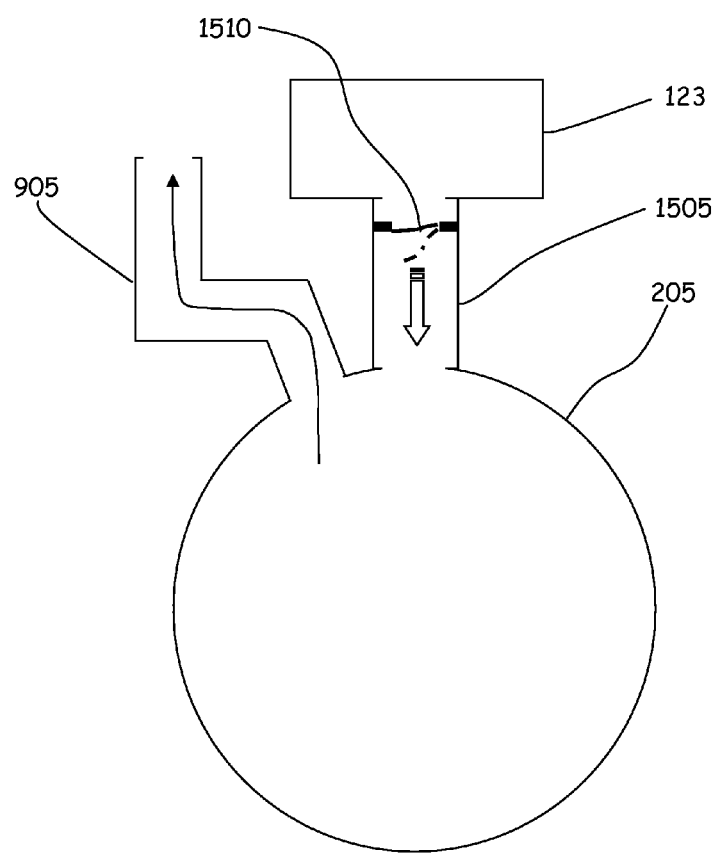
FIG. 15 schematically shows an optional fluff stop valve intended to be provided in the appliance of FIGS. 7-9, in an embodiment of the present invention.

FIG. 15 schematically depicts a solution to prevent that any fluff transported by the flow of drying air exiting the laundry treatment chamber enters into the detergent dispenser system. In fact, when the machine operates in drying mode, there is air turbulence inside the laundry treatment chamber 105, and fluff may penetrate into the detergent dispenser system (through the detergent delivery conduit 1505 that, from the drawer 123, leads the detergents into the washing tub). To avoid this, a one-way valve 1510, for example a membrane valve, is provided in the duct or bellow that connects the detergent dispenser system to the duct 1505; the membrane valve 1510 is configured to automatically open under the pressure/weight of the water coming from the detergent dispenser system, and to stay close when instead, during the drying, there is a flow of drying air exiting the drum.

It is pointed out that the solution schematically depicted in FIG. 15 is not limitatively useful in the laundry washer/dryer described so far, nor is it necessarily applicable only to laundry washer/dryers having a drying air moisture condensing and heating system formed of a heat pump: it can as well be applied to other types of laundry washer/dryers.

The present invention has been hereabove described by presenting some exemplary and non-limitative embodiments thereof.

Several modifications to the embodiments described in the foregoing can be envisaged.

For example, the user interface of the machine might have different designs: instead of having a dedicated button (the button 315, in the example discussed in the foregoing) for enabling the user make a selection about whether to activate the drying air heating resistor 255, one or more laundry drying programs (or washing and drying programs) might be implemented, which specifically calls for the activation of the drying air heating resistor; the user wishing the machine to perform one such program might select it via the cycle selector (like the rotary selector 305). Similar considerations apply also for the selection of the "Quick Dry", "Eco Dry" and "Silent Dry" cycles discussed above. For example, by repeatedly pushing the button 315 the user may sequence through the "Eco Dry", "Quick Dry" and "Silent Dry" drying modes, and the currently selected mode is advantageously displayed to the user on a display of the user interface 121. When the "Quick Dry" mode is displayed, if the user presses the start button 310 the machine automatically activates the heating resistor 255 (and operates the compressor at high output level and preferably the fan at high speed); when the "Silent Dry" is displayed, if the user presses the start button 310 the machine keeps the heating resistor 255 de-energized, operates the compressor at low output level and preferably the fan at low speed.

The invention claimed is:

1. An appliance for drying laundry including a drying-air moisture-condensing system comprising a heat pump system with a variable-output compressor having a compression mechanism and an electric motor for driving the compression mechanism, a controller to vary the rotational speed of the electric motor, wherein the controller is configured to vary the rotational speed of the electric motor so as to adjust the rotational speed of the compression mechanism in order to maintain constant a power absorbed by the compressor during at least a portion of a drying cycle.

2. The appliance of claim 1, wherein said portion of the drying cycle is subsequent to an initial transient phase of the drying cycle after the activation of the compressor wherein the power absorbed by the compressor increases.

3. The appliance of claim 2, wherein said portion of the drying cycle is a portion of the drying cycle after a time interval has elapsed from the compressor activation.

4. The appliance of claim 3, wherein said portion of the drying cycle is 30%-100% of a remaining portion of the laundry drying cycle after said time interval has elapsed from the compressor activation.

5. The appliance of claim 3, wherein said time interval elapsed from the compressor activation is at least 10 minutes.

6. The appliance of claim 1, wherein the controller is configured to control the rotational speed of the electric motor in such a way that the compressor absorbed power is, in at least one time interval of said portion of a drying cycle, essentially constant at a respective one value out of a discrete series of admissible values.

7. The appliance of claim 1, further configured to perform the drying cycle according to at least a first and a second drying mode, wherein in the first drying mode, the compressor absorbed power during said portion of the drying cycle has a first constant value, whereas in the second drying mode the compressor power during a portion of the drying cycle has a second constant value which is higher than the first value.

8. The appliance of claim 7, further configured to perform the drying cycle according to at least a third drying mode, wherein in the third drying mode, the compressor absorbed power during a portion of the drying cycle has a third constant value which is lower than the first value.

9. The appliance of claim 7, wherein said portion of the drying cycle is 30%-100% of a remaining portion of the laundry drying cycle after a time interval has elapsed from the compressor activation.

10. The appliance of claim 7, comprising a command input means provided on an appliance user interface activatable by a user to select the second drying mode, and a control unit configured to cause the appliance execute the drying cycle in said second drying mode when the user activates said command input means.

11. The appliance of claim 10, wherein said command input means is distinct from a laundry drying cycle selector provided on said user interface for enabling the user to select one out of a plurality of predetermined laundry drying cycles.

12. The appliance of claim 11, wherein the user interface further comprises an appliance start input means activatable by the user to start the execution of the laundry drying cycle selected through said laundry drying cycle selector, wherein the appliance is configured to execute the selected drying cycle in the second drying mode when the user activates said command input means before starting the appliance by actuating said start input means.

13. The appliance of claim 8, wherein said third drying mode is selectable by the user by actuating a command input means.

14. The appliance of claim 2, wherein after said transient the compressor absorbed power remains constant until the end of the drying cycle.

15. The appliance of claim 14, wherein after said transient, a rotational speed of the compression mechanism monotonically decreases for at least a portion of the drying cycle.

* * * * *